United States Patent [19]
Ricks et al.

[11] Patent Number: 5,626,358
[45] Date of Patent: May 6, 1997

[54] AIRBAG CUSHION ASSEMBLY WITH HORN SWITCH POCKET

[75] Inventors: Merle K. Ricks, Layton; Kristen K. S. Boyd, West Haven, both of Utah

[73] Assignee: Morton International, Inc., Chicago, Ill.

[21] Appl. No.: 587,855

[22] Filed: Jan. 11, 1996

[51] Int. Cl.$^6$ .......................... B60R 21/16; B60R 21/22
[52] U.S. Cl. .................. 280/731; 200/61.54; 280/743.1; 280/743.2
[58] Field of Search .................... 280/743.1, 743.2, 280/731, 739; 200/61.54, 61.55

[56] References Cited

U.S. PATENT DOCUMENTS

| | | | |
|---|---|---|---|
| 4,805,930 | 2/1989 | Takada | 280/739 |
| 5,004,266 | 4/1991 | Miller et al. | 280/743.2 |
| 5,498,023 | 3/1996 | Adams et al. | 280/743.1 |

FOREIGN PATENT DOCUMENTS

| | | | |
|---|---|---|---|
| 4-2543 | 1/1992 | Japan | 280/739 |

*Primary Examiner*—Eric D. Culbreth
*Attorney, Agent, or Firm*—George W. Rauchfuss, Jr.; Gerald K. White

[57] ABSTRACT

An airbag cushion assembly including an airbag cushion, a cushion strap and a horn switch pocket for use with a driver side airbag module. The horn switch pocket is for mounting a horn switch assembly and is secured to a tether of the cushion strap. The cushion strap retains the airbag cushion in a deflated, folded position prior to mounting the airbag cushion assembly within an airbag module and prior to inflation of the airbag cushion. The horn switch pocket is positioned on the tether so as to be tightly located between the tether and a horn activation face of an airbag module cover of the airbag module. The horn switch pocket can be made from the same material as the tether and the airbag cushion, and the horn switch pocket is sewn to the tether. According to one variation of the present invention, an airbag cushion assembly is provided having an airbag cushion and a horn pocket sewn directly to the airbag cushion.

22 Claims, 4 Drawing Sheets

5,626,358

AIRBAG CUSHION ASSEMBLY WITH HORN SWITCH POCKET

FIELD OF THE INVENTION

The present invention relates to a driver side airbag module horn switch attachment and, more particularly, to an airbag cushion assembly having a horn switch pocket for receiving a horn switch assembly.

BACKGROUND OF THE INVENTION

Driver side airbag modules, which include an airbag cushion and an airbag module cover, are normally positioned within a hub of a steering wheel of a motor vehicle. An annular retainer ring secures the airbag cushion to the airbag module, and a cushion strap holds the airbag cushion in a folded position prior to deployment. Both the airbag module cover and cushion strap include a tear seam or weakened portion for allowing the airbag cushion to break through and fully deploy during a collision or rapid deceleration of the motor vehicle.

The hub of the steering wheel happens to be the same area which conventionally includes the horn switch. Accordingly, the airbag module cover must additionally serve to actuate the horn switch. A horn switch assembly normally includes suitable components such as a membrane type horn switch and a backing plate for example, and the horn switch assembly is attached to an inner surface of a horn actuation face of the airbag module cover by ultrasonic welding or heat staking.

Mounting the horn switch assembly to the airbag module cover by ultrasonic welding or heat staking is a time consuming assembly process that increases the cost of manufacturing the airbag module. In addition, the horn switches are sometimes damaged by heat staking, requiring the replacement of both the horn switch assembly and airbag module cover since the entire airbag module cover must be replaced when replacing a damaged or defective horn switch assembly welded to the airbag module cover. Furthermore, heat staking puts constraints on the design, material and manufacture of the airbag module cover.

SUMMARY OF THE INVENTION

An object, therefore, of the present invention is to provide an airbag module having a horn switch assembly mounted to avoid one or all of the problems associated with welding or heat staking a horn switch assembly to an airbag module cover. In carrying out this invention there is provided a cushion strap for use with a folded, inflatable airbag cushion having a collar defining an open mouth for receiving inflation fluid. The cushion strap comprises a tether and a horn switch pocket. The tether has a first end securable to the collar of the airbag cushion and is sized to bridge across the folded airbag cushion. A second end of the tether is securable to the collar of the airbag cushion to retain the airbag cushion in a folded condition. A weakened portion of the tether is breakable upon inflation of the airbag cushion. The horn switch pocket is sized to contain a horn switch assembly and has a marginal edge secured to the tether and a pocket opening sized to receive a horn switch assembly.

According to one aspect of the present invention, an airbag cushion assembly for use in an airbag module is provided. The airbag cushion assembly comprises an airbag cushion and a horn switch pocket. The airbag cushion has a collar defining an open mouth for receiving inflation fluid, and the horn switch pocket is sized to contain a horn switch assembly and has a marginal edge secured to the airbag cushion and a pocket opening sized to receive a horn switch assembly.

According to another aspect of the present invention, an airbag cushion assembly for use in an airbag module is provided. The airbag cushion assembly comprises a folded, inflatable airbag cushion, a cushion strap and a horn switch pocket. The airbag cushion has a collar defining an open mouth for receiving inflation fluid, and the cushion strap has a tether. A first end of the tether extends from the collar of the airbag cushion and the tether is sized to bridge across the folded airbag cushion. A second end of the tether is secured to the collar of the airbag cushion to retain the airbag cushion in a folded condition. A weakened portion of the tether is breakable upon inflation of the airbag cushion. The horn switch pocket is sized to contain a horn switch assembly and has a marginal edge secured to the tether and a pocket opening sized to receive a horn switch assembly.

A horn switch pocket according to the present invention allows a horn switch assembly to be mounted within an airbag module without being heat staked or welded to an airbag module cover.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
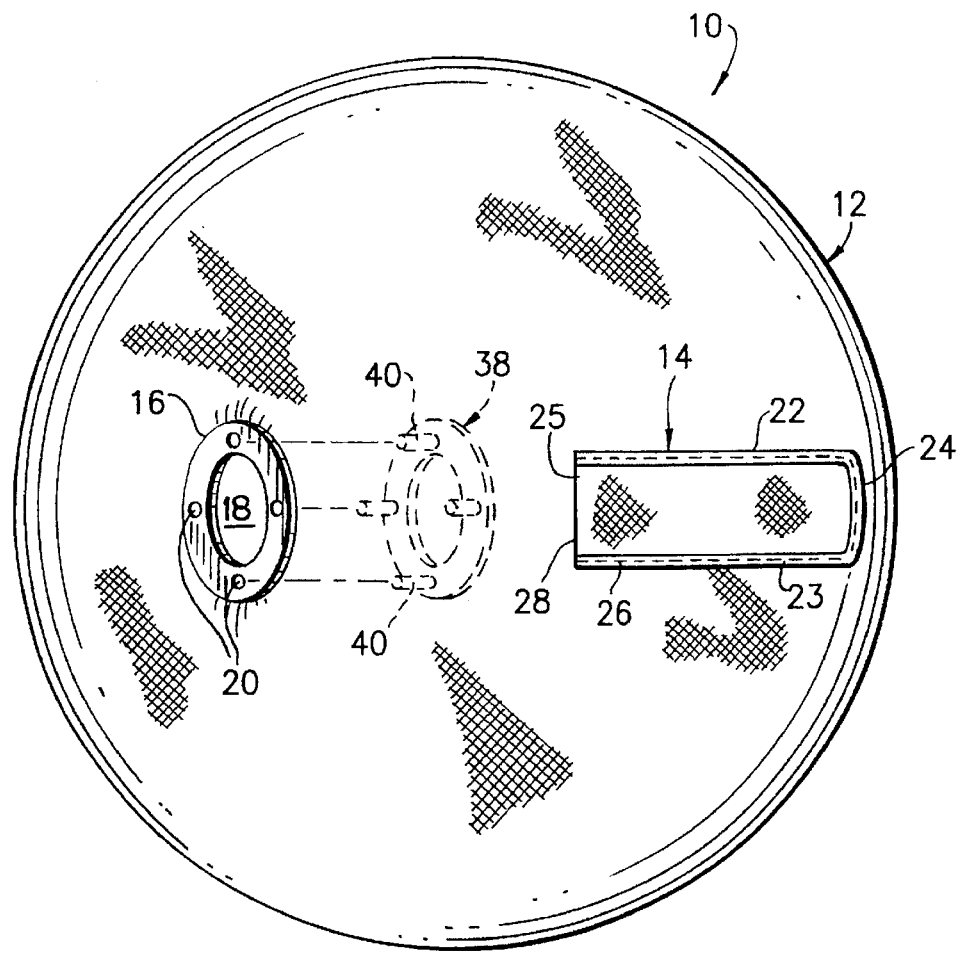
FIG. 1 is a perspective view of an airbag cushion assembly according to the present invention, including an airbag cushion and horn switch pocket.
Figure 2:
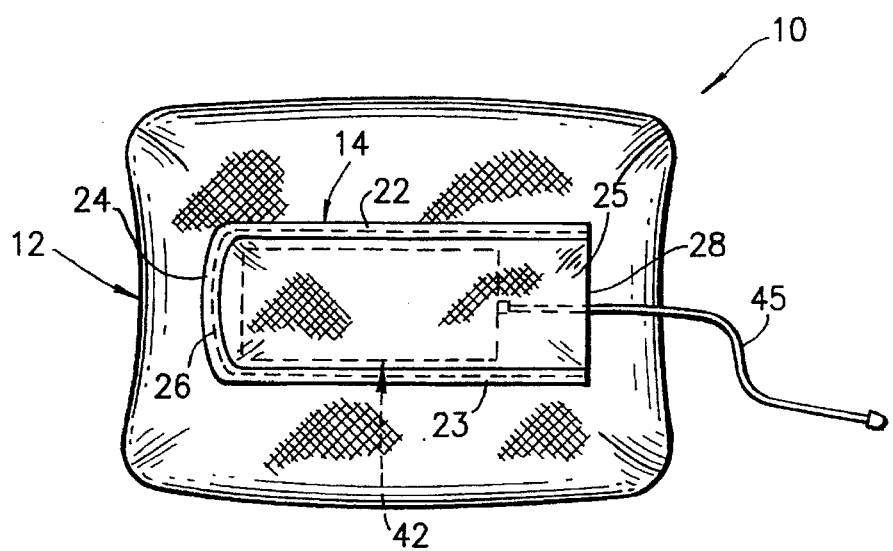
FIG. 2 is a top elevational enlarged view of the airbag cushion assembly of FIG. I with the airbag cushion folded and the horn switch pocket located on top of the folded airbag cushion and containing a horn switch.
Figure 3:
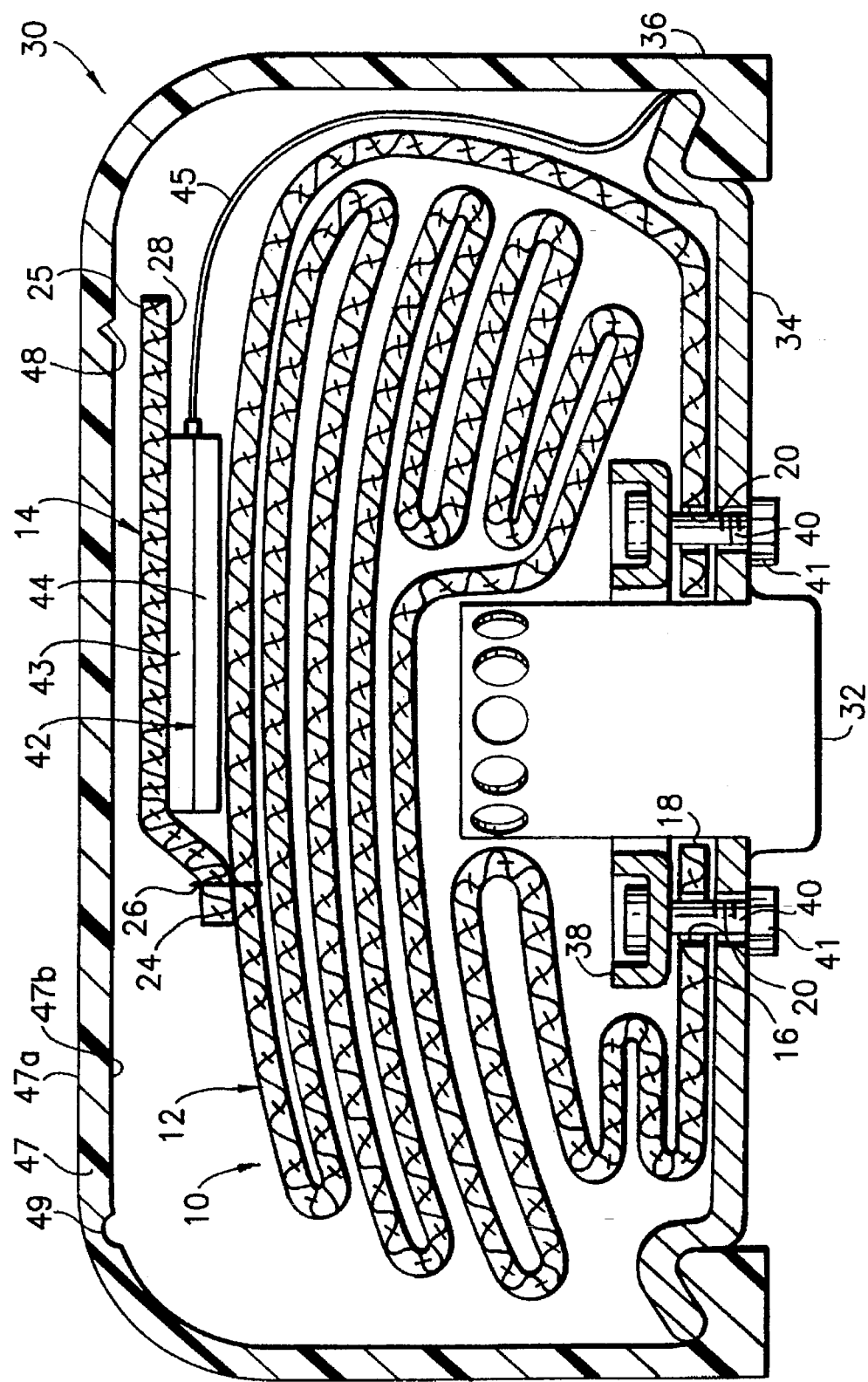
FIG. 3 is a side elevational further enlarged view, partially in section, of the airbag cushion assembly of FIG. 2 mounted within an airbag module.

Referring first to FIGS. 1 through 3, the present invention is directed to an airbag cushion assembly 10 including an airbag cushion 12 having a horn switch pocket 14. The airbag cushion 12 has a collar 16 forming an open mouth 18 and having a plurality of fastener receiving holes 20. An airbag cushion and the material comprising an airbag cushion are known to those skilled in the art. The horn switch pocket 14, which can be made from the same material as the airbag cushion 12, is generally rectangular and has a marginal edge comprising two longer opposed edges 22, 23 and two shorter opposed edges 24, 25. As shown, the two longer opposed edges 22, 23 and one shorter opposed edge 24 are secured to the airbag cushion 12 by stitching 26, and the other shorter opposed edge 25 forms a pocket opening 28 sized to receive a horn switch assembly. The horn switch pocket 14 is sized to contain a horn switch assembly 42, and is positioned on the side of the airbag cushion 12 towards the collar 16, as opposed to being located on the top of the airbag cushion opposite the collar, so that the horn switch pocket is less likely to come in contact with an occupant upon deployment of the airbag cushion.

Referring to FIG. 3, the airbag cushion assembly 10, with the airbag cushion 12 folded, is mounted in an airbag module 30 also including an inflator 32, a module housing 34 and an airbag module cover 36. The airbag module 30 is a driver side type of airbag module for mounting in a hub of a steering wheel. The airbag module 30 is known to those skilled in the art and therefore only described in detail as is relevant to the present invention. The collar 16 of the airbag cushion 12 is sandwiched between an annular retainer ring 38 and the module housing 34, and secured with four fasteners comprising bolts 40 extending from the retainer ring. The four bolts 40, which can be unitary with the retainer ring 38, pass through the four fastener receiving holes 20 of the collar 16 of the airbag cushion 12 and are secured with nuts 41 to secure the collar of the airbag cushion to the module housing 34. As shown in FIG. 1, the collar 16 of the airbag cushion 12 is normally mounted or secured to the retainer ring 38 and bolts 40 to form a sub-assembly for shipping and handling prior to being mounted in the airbag module.

The horn switch pocket 14 is shown containing the horn switch assembly 42 having suitable components such as a horn switch 43, a backing plate 44 and a lead 45 connectable to a remote horn control circuit (not shown) for example. The airbag module cover 36 includes a horn activation face 47 having an outer surface 47a and an inner surface 47b. It is intended that a driver will apply pressure to the outer surface 47a of the horn activation face 47 of the airbag module cover 36 to activate the horn switch 43 of the horn switch assembly 42. The airbag cushion 12 is folded so that the horn switch pocket 14 and horn switch assembly 42 are located between the folded airbag cushion and the inner surface 47b of the horn activation face 47 of the airbag module cover 36. For purposes of illustration, the airbag cushion 12 is shown loosely folded and packed within the airbag module cover 36. Actually, the airbag cushion 12 and horn switch assembly 42 are packed tightly against the inner surface 47b of the horn activation face 47 of the airbag module cover 36 so that the horn activation face does not have to be depressed very far to actuate the horn switch 43. Also for purposes of illustration, the airbag cushion 12 is shown thicker than actual.

The horn activation face 47 of the airbag module cover 36 has a tear seam 48 and hinge 49 to allow the airbag cushion 12 to break through the airbag module cover upon deployment. The horn switch pocket 14 should be positioned on the airbag cushion 12 so that upon deployment of the airbag cushion the pocket opening 28 is generally facing downwardly towards the collar 16 of the airbag cushion to reduce the chance of the horn switch assembly 42 being thrown out of the horn switch pocket. As shown, the horn switch pocket 14 is preferably positioned so that the pocket opening 28 extends below the tear seam 48 to ensure that the pocket opening will stay within the airbag module cover 36 upon deployment of the airbag cushion 12 so that the horn switch assembly 42 will not fall out.

Figure 4:
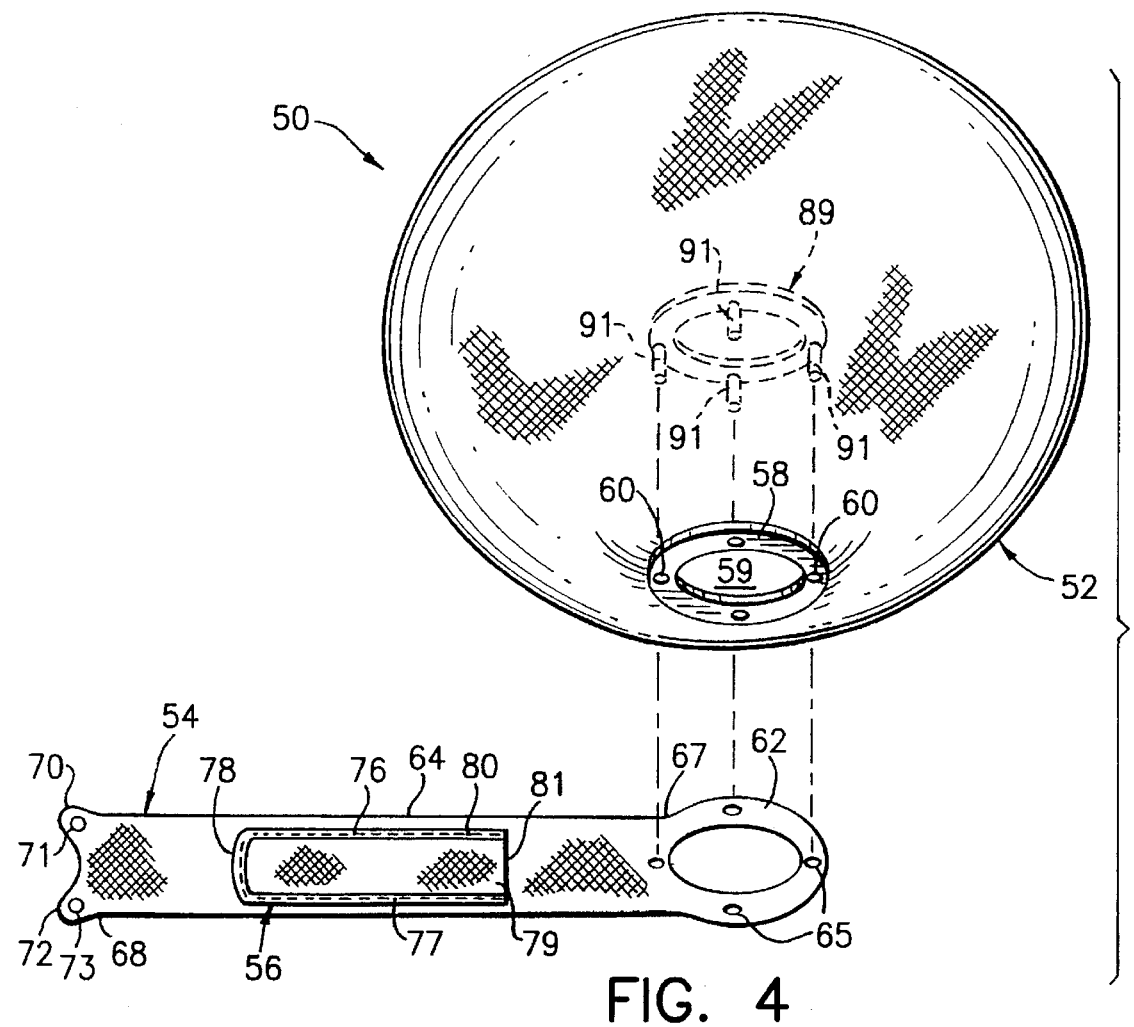
FIG. 4 is an exploded view of another airbag cushion assembly according to the present invention, including an airbag cushion and a cushion strap having a horn switch pocket.
Figure 5:
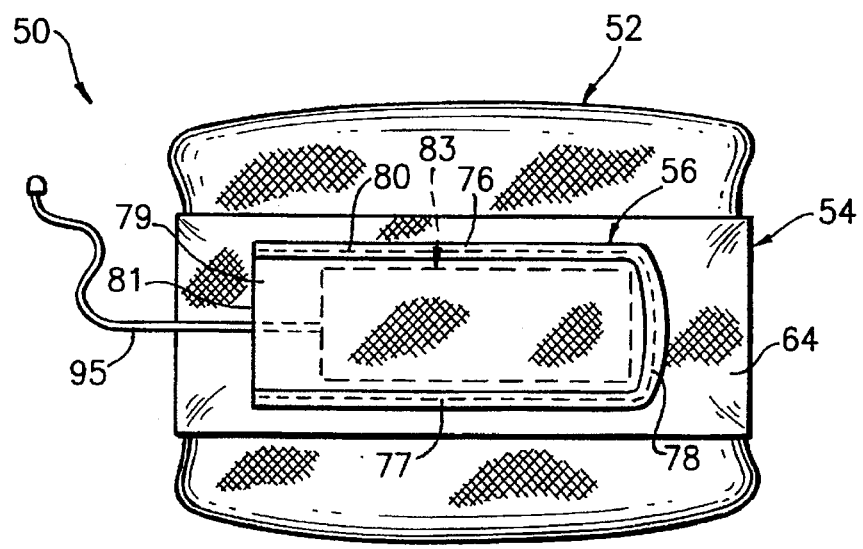
FIG. 5 is a top elevational enlarged view of the airbag cushion assembly of FIG. 4 with the airbag cushion folded, the cushion strap retaining the airbag cushion in its folded position and the horn switch pocket located on top of the cushion strap and folded airbag cushion and containing a horn switch.
Figure 6:
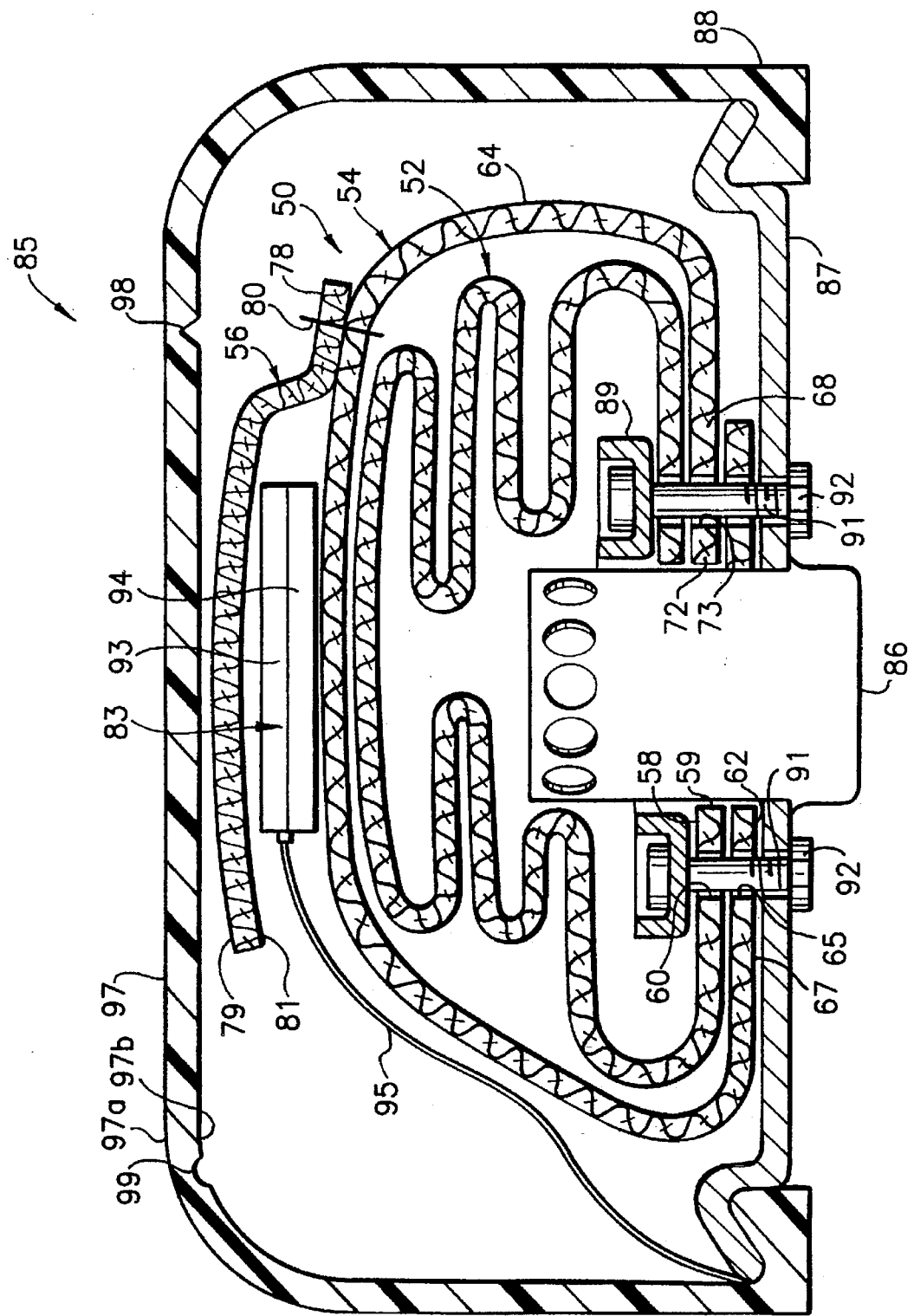
FIG. 6 is a side elevational further enlarged view, partially in section, of the airbag cushion assembly of FIG. 5 mounted within an airbag module.

Referring to FIGS. 4 through 6, another airbag cushion assembly 50 according to the present invention is shown and includes an airbag cushion 52, a cushion strap 54 and a horn switch pocket 56. The airbag cushion 52 has a collar 58 forming an open mouth 59 and having four fastener receiving holes 60. The cushion strap 54, which can be made from the same material as the airbag cushion 52, is for retaining the folded airbag cushion 52 in a folded condition and includes a collar 62 and a strap or tether 64. The collar 62 is similar to the collar 58 of the airbag cushion 52, defines four fastener receiving holes 65, and is positioned adjacent to the collar 58 of the airbag cushion 52. The collar 62 of the cushion strap 54 could also be secured to the collar 58 of the airbag cushion 52 as a unitary piece by stitching for example. The tether 64 has a first end 67 extending from the collar 62 of the cushion strap 54. In the alternative, the cushion strap 54 could be provided without the collar 62 and the first end 67 of the tether 64 could extend from the collar 58 of the airbag cushion 52. The tether 64 bridges across the folded airbag cushion 52 and has a second end 68 that is connectable either to the collar 58 of the airbag cushion 52, the collar 62 of the cushion strap 54 or a retainer ring. As shown, two tabs 70, 72 defining fastener receiving holes 71, 73 extend from the second end 68 of the tether 64 for attachment to a retainer ring as explained below. It is important that the tether 64 break upon deployment of the airbag cushion 52 so as not to interfere with the performance of the airbag cushion 52. The tether 64 should therefore be notched, perforated or otherwise have a weakened portion breakable upon cushion deployment. As shown, the weakened portion comprises the two tabs 70, 72 as the tabs are relatively very narrow compared to the tether 64 so that the tabs will break upon cushion deployment.

The horn switch pocket 56 is generally rectangular and has a marginal edge comprising two longer opposed edges 76, 77 and two shorter opposed edges 78, 79. As shown, the two longer opposed edges 76, 77 and one shorter opposed edge 78 are secured to the tether 64 of the cushion strap 54 by stitching 80, and the other shorter opposed edge 79 forms a pocket opening 81 sized to receive a horn switch assembly 83. The horn switch pocket 56 is sized to contain the horn switch assembly 83, and is positioned on the tether 64 so that the horn switch pocket is on top of the tether 64 and folded airbag cushion 52.

Referring to FIG. 6, the airbag cushion assembly 50 is mounted in an airbag module 85 also including an inflator 86, a module housing 87 and an airbag module cover 88. The collar 58 of the airbag cushion 52 and the collar 62 of the cushion strap 54 are sandwiched between an annular retainer ring 89 and the module housing 87 and secured with four fasteners comprising bolts 91 extending from the retainer ring 89. The bolts 90, which can be unitary with the retainer ring 89, pass through the fastener receiving holes 60 of the collar 58 of the airbag cushion 52 and the fastener receiving holes 65 of the collar 62 of the cushion strap 54 and are secured with nuts 92 to secure the collar of the airbag cushion and the collar of the cushion strap to the retainer ring 89. Two of the four bolts 91 also pass through the receiving holes 71, 73 of the two tabs 70, 72 extending from the second end 68 of the tether 64 to secure the second end of the tether to the module housing 87. As shown in FIG. 4, the collar 58 of the airbag cushion 52 and the collar 62 of the cushion strap 54 are normally mounted or secured to the retainer ring 89 and bolts 91 to form a sub-assembly for shipping and handling prior to being mounted in the airbag module.

The horn switch pocket 56 is shown containing the horn switch assembly 83 having suitable components such as a horn switch 93, a backing plate 94 and a lead 95 connecting the horn switch to a remote horn control circuit (not shown) for example. The airbag module cover 88 includes a horn activation face 97 having an outer surface 97a and an inner surface 97b. It is intended that a driver will apply pressure to the outer surface 97a of the horn activation face 97 of the airbag module cover 88 to activate the horn switch 93 of the horn switch assembly 83. The horn switch pocket 56 and horn switch assembly 83 are located directly below the inner surface 97b of the horn activation face 97 of the airbag module cover 88. For purposes of illustration, the airbag cushion 52 is shown loosely folded and packed within the airbag module cover 88. Actually, the airbag cushion 52 and horn switch assembly 83 are packed tightly against the inner surface 97a of the horn activation face 97 of the airbag module cover 88 so that the horn activation face does not have to be depressed very much to actuate the horn switch 93. Also for purposes of illustration, the airbag cushion 52 is shown thicker than actual.

The horn activation face 97 of the airbag module cover 88 has a tear seam 98 and a hinge 99. Upon deployment of the airbag cushion 52 the horn activation face 97 breaks at the tear seam 98 and swings out of the path of the airbag cushion about the hinge 99. The cushion strap 54 is preferably positioned with respect to the airbag module cover 88 so that when the airbag cushion 52 is deployed, breaking the tabs 70, 72, the tether 64 and horn switch pocket 56 will swing out of the path of the airbag cushion in the same direction as the horn activation face 97 of the airbag module cover 88. As shown, the horn switch pocket 56 is positioned on the tether 64 so that when the tether swings out of the path of the airbag cushion 52, the pocket opening 81 will generally face downwardly towards the collar 62 of the cushion strap 54 to reduce the chance of the horn switch assembly 83 being thrown out of the horn switch pocket. In the alternative, the cushion strap 54 could be positioned with respect to the airbag module cover 88 so that the tether 64 and horn switch pocket 56 will swing out of the path of the airbag cushion 52 in the opposite direction of the horn activation face 97 of the airbag module cover 88. In that case, the horn switch pocket 56 should be positioned so that the pocket opening end will face downwardly as the tether 64 swings out of the path of the airbag cushion 52, and preferably so that the pocket opening extends below the tear seam 98 to ensure that the pocket opening will stay within the airbag module cover 88 upon deployment of the airbag cushion to minimize further the chance of the horn switch assembly 83 falling out.

A horn switch pocket according to the present invention allows a horn switch assembly to be mounted within an airbag module without being heat staked or welded to an airbag module cover. The horn switch assembly is simply inserted into the horn switch pocket during assembly of the airbag module, and removed from the horn switch pocket during servicing or replacement of the horn switch assembly. The present invention may include other changes and modifications without departing from its true spirit and scope. For example, the horn switch pocket could be shaped differently than shown and described to accommodate a different horn switch assembly. Also the horn switch pocket could be secured to the airbag cushion or tether by means other than stitching such as a suitable adhesive, for example. Many changes are possible.

Since other requirements and environments varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

We claim:

1. An airbag cushion assembly for use in an airbag module, the assembly comprising:

an airbag cushion having a collar defining an open mouth for receiving inflation fluid; and a horn switch pocket sized to contain a horn switch assembly, the horn switch pocket having a pocket opening sized to receive a horn switch assembly, the horn switch pocket secured to the airbag cushion.

2. The airbag cushion assembly of claim 1 further comprising:

a retainer ring secured to the collar of the airbag cushion.

3. The airbag cushion assembly of claim 1 further comprising:

a horn switch assembly contained within the horn switch pocket.

4. The airbag cushion assembly of claim 1 wherein:

the horn switch pocket having a marginal edge, at least a portion of the marginal edge secured to the airbag cushion.

5. The airbag cushion assembly of claim 4 wherein:

the horn switch pocket being generally rectangular with the marginal edge being divided into two longer opposed edges and two shorter opposed edges, the two longer opposed edges and one shorter opposed edge comprising the portion of the marginal edge secured to the airbag cushion, and the other shorter opposed edge forming the pocket opening.

6. The airbag cushion assembly of claim 5 wherein:

the portion of the marginal edge of the horn switch pocket is secured to the airbag cushion by stitching.

7. The airbag cushion assembly of claim 1 further comprising:

a cushion strap including a tether having a first end extending from the collar of the airbag cushion, the airbag cushion being folded, the tether bridging across the folded airbag cushion and having a second end secured to the collar of the airbag cushion to retain the airbag cushion in a folded condition, a weakened portion of the tether breakable upon inflation of the airbag cushion; and the horn switch pocket having a marginal edge, at least a portion of the marginal edge secured to the tether between the first end and the second end.

8. The airbag cushion assembly of claim 7 wherein:

the cushion strap having a collar secured to the collar of the airbag cushion, the first end of the tether extending from the collar of the cushion strap, and the second end of the tether secured to the collar of the cushion strap.

9. The airbag cushion assembly of claim 8 wherein:

the horn switch pocket being generally rectangular with the marginal edge being divided into two longer opposed edges and two shorter opposed edges, the two longer opposed edges and one shorter opposed edge comprising the portion of the marginal edge secured to the tether, and the other shorter opposed edge forming the pocket opening.

10. The airbag cushion assembly of claim 9 wherein:

the portion of the marginal edge of the horn switch pocket is secured to the tether of the cushion strap by stitching.

11. A cushion strap for use with a folded, inflatable airbag cushion having a collar defining an open mouth for receiving inflation fluid, the cushion strap comprising:

a tether having a first end securable to the collar of the airbag cushion, the tether sized to bridge across the folded airbag cushion and having a second end securable to the collar of the airbag cushion to retain the airbag cushion in a folded condition, a weakened portion of the tether breakable upon inflation of the airbag cushion; and a horn switch pocket sized to contain a horn switch assembly and having a marginal edge and a pocket opening sized to receive a horn switch assembly, at least a portion of the marginal edge secured to the tether between the first end and the second end of the tether.

12. The airbag cushion assembly of claim 11 further comprising:

a horn switch assembly contained within the horn switch pocket.

13. The cushion strap of claim 11 wherein:

the cushion strap having a collar securable to the collar of the airbag cushion, the first end of the tether extending from the collar of the cushion strap, and the second end of the tether securable to the collar of the cushion strap.

14. The cushion strap of claim 13 wherein:

the horn switch pocket being generally rectangular with the marginal edge being divided into two longer opposed edges and two shorter opposed edges, the two longer opposed edges and one shorter opposed edge comprising the portion of the marginal edge secured to the tether, and the other shorter opposed edge forming the pocket opening.

15. The cushion strap of claim 14 wherein:

the portion of the marginal edge of the horn switch pocket is secured to the tether of the cushion strap by stitching.

16. An airbag cushion assembly for use in an airbag module, the assembly comprising:

a folded, inflatable airbag cushion having a collar defining an open mouth for receiving inflation fluid;

a retainer ring secured to the collar of the airbag cushion;

a cushion strap including a tether and a collar, the collar secured to the retainer ring and the tether having a first end extending from the collar of the cushion strap, the tether bridging across the folded airbag cushion and having a second end secured to the retainer ring to retain the airbag cushion in a folded condition, a weakened portion of the tether being breakable upon inflation of the airbag cushion; and a horn switch pocket sized to contain a horn switch assembly and having a pocket opening sized to receive a horn switch assembly, the horn switch pocket secured to the airbag cushion.

17. The airbag cushion assembly of claim 16 wherein:

the horn switch pocket having a marginal edge, at least a portion of the marginal edge secured to the tether between the first end and the second end.

18. The airbag cushion assembly of claim 17 wherein:

the horn switch pocket being generally rectangular and having a marginal edge divided into two longer opposed edges and two shorter opposed edges, the two longer opposed edges and one shorter opposed edge comprising the portion of the marginal edge secured to the tether, and the other shorter opposed edge forming the pocket opening.

19. The airbag cushion assembly of claim 18 wherein:

the two longer opposed edges and one shorter opposed edge of the marginal edge of the horn switch pocket being secured to the tether of the cushion strap by stitching.

20. The airbag cushion assembly of claim 19 wherein:

the collar of the airbag cushion having a plurality of fastener receiving holes;

the collar of the cushion strap having a plurality of fastener receiving holes;

a plurality of fasteners extending from the retainer ring through the plurality of fastener receiving holes in the collar of the airbag cushion and through the plurality of fastener receiving holes in the collar of the cushion strap to secure the collar of the airbag cushion and the collar of the cushion strap to the retainer ring; and two tabs extending from the second end of the tether, each tab defining a fastener receiving hole positioned around a fastener of the plurality of fasteners extending from the retainer ring to secure the second end of the tether to the retainer ring, the weakened portion of the tether comprising the two tabs.

21. The airbag cushion assembly of claim 20, wherein:

the horn switch pocket positioned on the tether of the cushion strap so that the horn switch pocket will be located between the tether and a horn activation face of an airbag module cover of an airbag module when the airbag cushion assembly is mounted in the airbag module.

22. The airbag cushion assembly of claim 21 further comprising:

a horn switch assembly contained within the horn switch pocket.

* * * * *